US012617641B2

(12) United States Patent
Suzuki

(10) Patent No.: US 12,617,641 B2
(45) Date of Patent: May 5, 2026

(54) SHEET TRANSPORTATION DEVICE

(71) Applicant: Prime Planet Energy & Solutions, Inc., Tokyo (JP)

(72) Inventor: Masanori Suzuki, Takatsuki (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 79 days.

(21) Appl. No.: 18/663,071

(22) Filed: May 14, 2024

(65) Prior Publication Data

US 2024/0383709 A1    Nov. 21, 2024

(30) Foreign Application Priority Data

May 19, 2023    (JP) ................................. 2023-082846

(51) Int. Cl.
| | |
|---|---|
| *B65H 18/00* | (2006.01) |
| *B65H 23/02* | (2006.01) |
| *H01M 10/04* | (2006.01) |

(52) U.S. Cl.
CPC ......... *B65H 18/00* (2013.01); *B65H 23/0204* (2013.01); *B65H 2404/1316* (2013.01); *B65H 2553/42* (2013.01); *B65H 2701/19* (2013.01); *H01M 10/0404* (2013.01)

(58) Field of Classification Search
CPC ........ B65H 18/00; B65H 18/02; B65H 18/04; B65H 18/06; B65H 23/0204; B65H 23/0208; B65H 2404/1316; B65H 2404/13161; B65H 2404/13162; B65H 2404/13163; B65H 2404/1317; B65H 2404/13171; B65H 2553/42; B65H 2701/19; H01M 10/0404; H01M 10/0409; H01M 10/0413; H01M 10/0418; H01M 10/0587
USPC ....................................................... 242/534.1
See application file for complete search history.

(56) References Cited

U.S. PATENT DOCUMENTS

| | | | | |
|---|---|---|---|---|
| 6,450,382 B1 * | 9/2002 | Ohno | ................. | B65H 23/0204 226/22 |
| 2013/0260019 A1 | 10/2013 | Sugie | | |
| 2021/0043980 A1 | 2/2021 | Wang et al. | | |

(Continued)

FOREIGN PATENT DOCUMENTS

| | | | | | |
|---|---|---|---|---|---|
| CN | 107042256 A | * | 8/2017 | ............ | H01M 4/139 |
| CN | 207787381 U | * | 8/2018 | | |
| CN | 209641752 U | | 11/2019 | | |

(Continued)

*Primary Examiner* — Joshua E Rodden
(74) *Attorney, Agent, or Firm* — HAUPTMAN HAM, LLP

(57) ABSTRACT

A sheet transportation device includes a guide roll along which a sheet is to be wound. The sheet includes a plurality of tabs provided intermittently in a longitudinal direction along at least one end in a width direction. The guide roll includes a cylindrical roll main body and a short-diameter portion connected with the roll main body so as to be outer, in the width direction of the sheet, to the roll main body. The roll main body is located closer to a center, in the width direction, of the sheet than a transportation path for the end. A portion of the sheet that is closer to the center than the end is wound along the roll main body. The short-diameter portion is connected with the roll main body via a stepped portion, and has an outer diameter shorter than an outer diameter of the roll main body.

6 Claims, 4 Drawing Sheets

(56) References Cited

U.S. PATENT DOCUMENTS

2022/0278307 A1 * 9/2022 Mimura ............. H01M 4/0435
2022/0293911 A1 * 9/2022 Haga ................... H01M 4/139

FOREIGN PATENT DOCUMENTS

| | | | |
|----|----------------|-----|---------|
| JP | H09169456 A | | 6/1997 |
| JP | H11334953 A | | 12/1999 |
| JP | 2014-116141 A | | 6/2014 |
| JP | 2014101221 A | | 6/2014 |
| JP | 2015-090805 A | | 5/2015 |
| JP | 2016-219329 A | | 12/2016 |
| JP | 2017-228349 A | | 12/2017 |
| JP | 2019-212434 A | | 12/2019 |
| JP | 2021-028896 A | | 2/2021 |
| JP | 2021-086698 A | | 6/2021 |
| KR | 2016019300 A | * | 2/2016 |
| KR | 10-2020-0104598 A | | 9/2020 |
| KR | 10-2023-0032989 A | | 3/2023 |
| WO | 2012073329 A1 | | 6/2012 |

* cited by examiner

SHEET TRANSPORTATION DEVICE

CROSS REFERENCE TO RELATED APPLICATION

This application claims the benefit of priority to Japanese Patent Application No. 2023-082846 filed on May 19, 2023. The entire contents of this application are hereby incorporated by reference herein.

BACKGROUND

The present invention relates to a sheet transportation device transporting a sheet.

For example, Japanese Laid-Open Patent Publication No. 2017-228349 discloses a heating transportation furnace transporting, while heating, an electrode sheet coated with a composite material containing an active material. In the heating transportation device described in Japanese Laid-Open Patent Publication No. 2017-228349, the electrode sheet is transported in a zigzag manner while being bent along a plurality of rolls. Each of the rolls includes a short-diameter portion and a long-diameter portion located at each of two ends of the short-diameter portion. Japanese Laid-Open Patent Publication No. 2017-228349 describes that both of two side edges of the electrode sheet are stretched by the long-diameter portions. Therefore, when the portion of the electrode sheet that is coated with the composite material is pressed d and stretched in a pressing step after the transportation, a state where the side edges of the electrode sheet are wrinkled is suppressed.

For example, Japanese Laid-Open Patent Publication No. 2016-219329 discloses a transportation device transporting a component of an electrode plate. The component of the electrode plate is a metal plate including a plurality of tabs protruding from an end thereof in a width direction thereof. The transportation device described in Japanese Laid-Open Patent Publication No. 2016-219329 transports the metal plate by a pair of, more specifically, top and bottom, transportation rollers. The transportation device described in Japanese Laid-Open Patent Publication No. 2016-219329 includes a guide that prevents the tabs from being hung downward or flapped and thus prevents the tabs from being rolled into the rollers.

For example, Japanese Laid-Open Patent Publication No. 2021-086698 discloses a winding device winding an electrode sheet including tabs. Japanese Laid-Open Patent Publication No. 2021-086698 describes that when an electrode sheet is wound and thus curved from a flat state, the tabs are easily folded or raised. The winding device described in Japanese Laid-Open Publication No. 2021-086698 Patent includes a blow mechanism that sprays air onto the tabs to supply the tabs with a force directed toward a rotation shaft of a winding core and thus suppresses a state where the tabs are folded or raised.

SUMMARY

Also in the case where a sheet including tabs is transported by the sheet transportation device as described in Japanese Laid-Open Patent Publication No. 2017-228349, which winds the sheet along the guide rolls and transports the sheet along a transportation path bent in a zigzag manner, the tabs may possibly be raised as described in Japanese Laid-Open Patent Publication No. 2021-086698. It is conceived that a state where the tabs are raised is suppressed by provision of the blow mechanism as described in Japanese Laid-Open Patent Publication No. 2021-086698. However, this complicates the structure of the sheet transportation device. This specification proposes a sheet transportation device that winds a sheet along guide rolls and transports the sheet along a transportation path bent in a zigzag manner and moreover, in the case of transporting a sheet including tabs, suppresses a state where the tabs are raised with a simpler structure.

A sheet transportation device disclosed herein transports a band-like sheet in a longitudinal direction thereof. The sheet transportation device includes a guide roll located in a transportation path for the sheet and extending in a width direction of the sheet. The sheet is to be wound along the guide roll. The sheet includes a plurality of tabs provided intermittently in the longitudinal direction thereof, along at least one end thereof in the width direction thereof. The plurality of tabs each protrude in the width direction beyond the end. The guide roll includes a cylindrical roll main body and a short-diameter portion connected with the roll main body so as to be outer, in the width direction, to the roll main body. The roll main body is located closer to a center, in the width direction, than a transportation path for the end of the sheet along which the plurality of tabs are provided. A portion of the sheet that is closer to the center in the width direction than the end is wound along the roll main body. The short-diameter portion is connected with the roll main body via a stepped portion, and has an outer diameter shorter than an outer diameter of the roll main body.

In the case of transporting a sheet including a plurality of tabs, the sheet transportation device suppresses a state where the tabs are raised, for the reasons described below.

DETAILED DESCRIPTION

Hereinafter, a preferred embodiment of a sheet transportation device will be described. The preferred embodiment described herein is not intended to specifically limit the present invention, needless to say. The drawings show schematic views, and do not reflect any actual product embodying the present invention.

[Structure of the Sheet Transportation Device]

Figure 1:
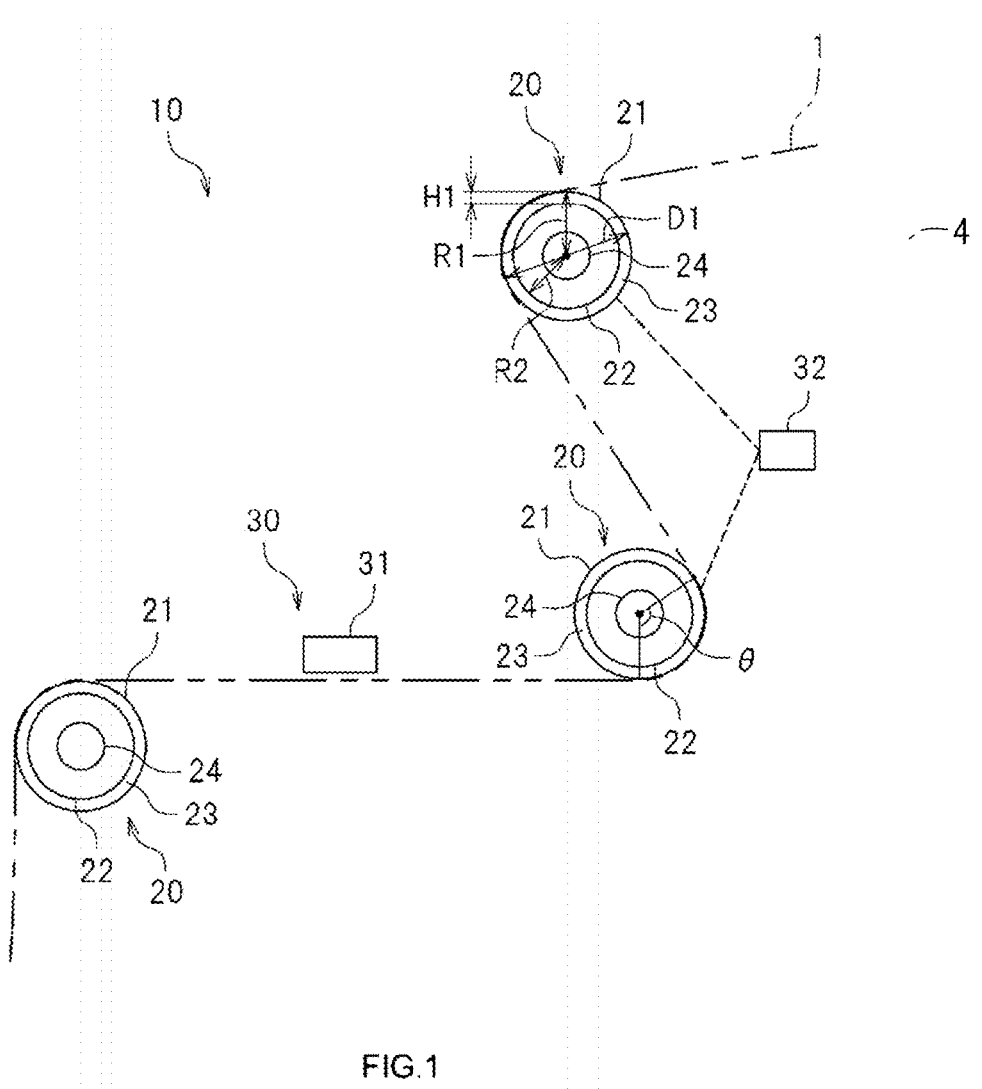
FIG. 1 is a schematic side view of a sheet transportation device according to a preferred embodiment of the present invention.

FIG. 1 is a schematic side view of a sheet transportation device 10 according to a preferred embodiment. The sheet transportation device 10 transports a belt-like sheet 1 in a longitudinal direction thereof. In a preferred example, the sheet 1 is an electrode sheet 1 for an electricity storage device, and the electrode sheet 1 includes a metal current collector foil 2 and an electrode active material layer 3 formed thereon (see FIG. 2). In this embodiment, the electrode sheet 1 is an electrode sheet of a lithium ion secondary battery. It should be noted that the sheet to be transported by the sheet transportation device 10 is not limited to the electrode sheet 1 of a lithium ion secondary battery, and may be an electrode sheet of any of various known electricity storage devices. Alternatively, the sheet to be transported by the sheet transportation device 10 does not need to be an electrode sheet of an electricity storage device. Herein, the term "electricity storage device" refers to any device capable of extracting energy, electrical and encompasses so-called storage batteries (chemical batteries) such as lithium ion secondary batteries, nickel hydrogen batteries and the like, and also capacitors (physical batteries) such as electric double layer capacitors and the like.

The electrode sheet 1 includes the current collector foil 2, which is band-like, and the electrode active material layer 3 formed on a surface of the current collector foil 2. In the case where the electrode sheet 1 is a positive electrode sheet, the current collector foil 2 is, for example, an aluminum foil. In the case where the electrode sheet 1 is a positive electrode sheet, the electrode active material layer 3 contains a positive electrode active material. In, for example, a lithium ion secondary battery, the positive electrode active material is a material capable of releasing lithium ions when being charged and absorbing lithium ions when being discharged. Such a material is, for example, a lithium transition metal composite material. In the case where the electrode sheet 1 is a negative electrode sheet, the current collector foil 2 is, for example, a copper foil. In the case where the electrode sheet 1 is a negative electrode sheet, the electrode active material layer 3 contains a negative electrode active material. In, for example, a lithium ion secondary battery, the negative electrode active material is a material capable of, when being charged, occluding lithium ions and, when being discharged, releasing lithium ions occluded when being charged. Such a material is, for example, natural graphite. Various materials other than those mentioned above have been proposed as the materials of the current collector foil 2 and the electrode active material, and there is no specific limitation on the material of the current collector foil 2 or the electrode active material.

Figures 2, 3:
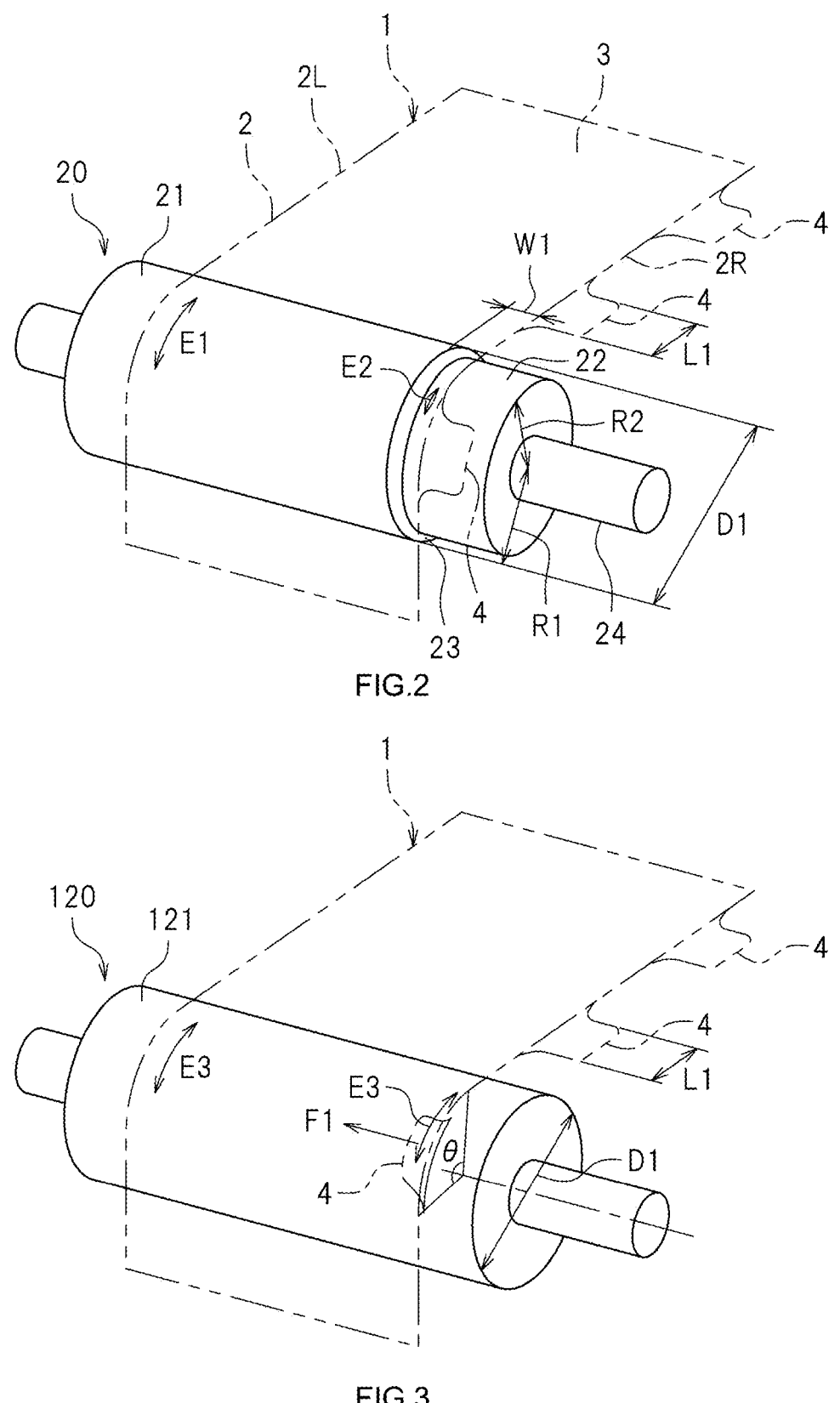
FIG. 2 is a schematic perspective view of a guide roll.
FIG. 3 is a schematic perspective view of a conventional guide roll.

FIG. 2 is a schematic perspective view of a guide roll 20, along which the electrode sheet 1 is to be wound in the sheet transportation device 10. As shown in FIG. 2, the electrode active material layer 3 is formed between two ends 2L and 2R, in a width direction, of the electrode sheet 1 (more specifically, the current collector foil 2). In this embodiment, the electrode active material layer 3 is formed on the entirety of the width of the current collector foil 2 between the two ends 2L and 2R. However, the electrode active material layer 3 may be formed on a part, in the width direction, of the current collector foil 2 between the two ends 2L and 2R. In this case, the electrode sheet 1 includes an exposed portion, where the electrode active material layer 3 is not formed and the current collector foil 2 is exposed. As shown in FIG. 2, the electrode sheet 1 includes a plurality of tabs 4 provided along one end 2R in the width direction. The plurality of tabs 4 are provided intermittently in the longitudinal direction of the electrode sheet 1. In this embodiment, the plurality of tabs 4 are provided along one end 2R, in the width direction, of the electrode sheet 1. No tab 4 is provided along the other end 4L. However, the tabs 4 may be provided along both of the two ends 2L and 2R, in the width direction, of the electrode sheet 1. As shown in FIG. 2, the plurality of tabs 4 each protrude in the width direction of the electrode sheet 1 beyond the end 2R of the electrode sheet 1.

As shown in FIG. 1, the sheet transportation device 10 includes a plurality of the guide rolls 20 located along a transportation path for the electrode sheet 1. It should be noted that the sheet transportation device 10 may include only one guide roll 20. As shown in FIG. 2, the plurality of guide rolls 20 each extend in the width direction of the electrode sheet 1. The guide rolls 20 are each longer than the electrode sheet 1 in the width direction of the electrode sheet 1. The electrode sheet 1 is wound along each of the guide rolls 20. The transportation path for the electrode sheet 1 is bent at each of the guide rolls 20, and the direction of the transportation path is changed a plurality of times. The electrode sheet 1 is supplied with a tensile force by being wound along the guide rolls 20. The sheet transportation device 10 includes a driving device (not shown) feeding the electrode sheet 1. The driving device includes, for example, a pair of nip rollers that rotate while sandwiching the electrode sheet 1.

As shown in FIG. 2, in this preferred embodiment, each of the guide rolls 20 includes a cylindrical roll main body 21 and a short-diameter portion 22 connected with the roll main body 21 so as to be outer, in the width direction, to the electrode sheet 1. The short-diameter portion 22 has an outer diameter shorter than an outer diameter of the roll main body 21. In this preferred embodiment, the short-diameter portion 22 is cylindrical and is concentric with the roll main body 21. As shown in FIG. 1, the short-diameter portion 22 has a radius R2, which is shorter than a radius R1 of the roll main body 21. The short-diameter portion 22 is connected with the roll main body 21 via a stepped portion 23. A border between the roll main body 21 and the short-diameter portion 22 is the stepped portion 23.

In this embodiment, the stepped portion 23 extends so as to be perpendicular to an outer circumferential surface of the roll main body 21. The stepped portion 23 has a height H1, which corresponds to the difference between the radius R1 of the roll main body 21 and the radius R2 of the short-diameter portion 22. In this preferred embodiment, the height H1 of the stepped portion 23 is the same regardless of the position in a circumferential direction of the guide roll 20. However, the height H1 of the stepped portion 23 may vary depending on the position in the circumferential direction of the guide roll 20. For example, the short-diameter portion 22 may have a cross-section that is not circular. In the case where the tabs 4 are formed along both of the two ends 2R and 2L of the electrode sheet 1, the short-diameter portion 22 and the stepped portion 23 are provided on each of two sides of the roll main body 21.

As shown in FIG. 2, the roll main body 21 is located closer to a center, in the width direction, of the electrode sheet 1 than a transportation path for the end 2R of the electrode sheet 1, the plurality of tabs 4 being formed along the end 2R. The electrode sheet 1 is transported such that the end 2R passes along a path outer in the width direction to the roll main body 21 (outer in the width direction to the stepped portion 23, which is the border between the roll main body 21 and the short-diameter portion 22). A portion of the electrode sheet 1 that is closer to the center in the width direction than the end 2R is wound along the roll main body 21. A portion of the electrode sheet 1 that is inner to, and within a predetermined distance W1 from, the end 2R, and the plurality of tabs 4, are not wound along the guide roll 20 and are floating in the air even in a state where the rest of the electrode sheet 1 is wound along the guide roll 20.

In this embodiment, the roll main body 21 and the short-diameter portion 22 are integrally formed with each other. It should be noted that the roll main body 21 and the short-diameter portion 22 may be formed as separate components. The roll main body 21 and the short-diameter portion 22 integrally rotate in a transportation direction of the electrode sheet 1. As shown in FIG. 2, the guide roll 20 includes a support shaft 24 connected with the short-diameter portion 22 and extending outward in the width direction from the short-diameter portion 22. The support shaft 24 extends in the width direction of the electrode sheet 1. The support shaft 24 is supported by a bearing (not shown) so as to be rotatable in the transportation direction of the electrode sheet 1. The support shaft 24 may be a rotation shaft that supports the roll main body 21 and the short-diameter portion 22 such that the roll main body 21 and the short-diameter portion 22 are rotatable in the transportation direction of the electrode sheet 1.

As shown in FIG. 1, the sheet transportation device 10 further includes a meandering correction device 30 correcting a position of the electrode sheet 1 in the width direction. The meandering correction device 30 includes a sensor 31 detecting the position of the electrode sheet 1 in the width direction. The sensor 31 is, for example, a camera detecting the position of the end 2R or 2L, but there is no specific limitation on the structure of the sensor 31. The meandering correction device 30 corrects the position of the electrode sheet 1 in the width direction based on the position of the electrode sheet 1 detected by the sensor 31. In this embodiment, the meandering correction device 30 includes a tilting device 32 tilting a pair of guide rolls 20 located side by side in the transportation path for the electrode sheet 1 among the plurality of guide rolls 20, such that the pair of guide rolls 20 are tilted in association with each other. The tilting device 32 tilts the pair of guide rolls 20 in an associated manner, such that the guide rolls 20 are lowered on the 2R side or on the 2L side. As a result, the position of the electrode sheet 1 in the width direction is corrected. The positional shift of the electrode sheet 1 in the width direction is corrected, and as a result, the electrode sheet 1 is transported along the predetermined transportation path, by which the end 2R passes along a path outer to the roll main body 21. It is possible that even when the meandering correction device 30 is provided, the position of the electrode sheet 1 in the width direction is shifted slightly (e.g., by about 0.1 mm). Therefore, the distance W1 between the end 2R of the electrode sheet 1 and the roll main body 21 is set to be longer than the maximum possible value by which the electrode sheet 1 may be positionally shifted in the width direction.

[Reasons why the Tabs are Raised]

It is known as described in Japanese Laid-Open Patent Publication No. 2021-086698 that when a sheet including tabs such as an electrode sheet or the like is wound along a roll and is curved from a flat state, the tabs are easily raised outward in a diametrical direction of the roll. According to the knowledge of the present inventor, the tabs are raised for the following reasons.

FIG. 3 shows a structure of a conventional guide roll 120, along which the electrode sheet 1 is wound in the entirety of the width thereof. As shown in FIG. 3, the conventional guide roll 120 does not include any short-diameter portion. Even if a short-diameter portion is provided, the electrode sheet 1 is wound along a roll main body 121 in the entirety of the width thereof. In the conventional guide roll 120, a roll main body 121 is longer than the electrode sheet 1 in the width direction of the electrode sheet 1. As shown in FIG. 3, while a portion of the electrode sheet 1 that is at the root of the tab 4 is wound along the guide roll 120, an inertia force (centrifugal force) F1 directed outward in the diametrical direction of the guide roll 120 acts on the tab 4. This inertia force F1 causes the tab 4 to be raised outward in the diametrical direction of the guide roll 120. Even if the inertia forcer F1 itself is not strong enough to bend the tab 4, the tab 4 is slightly deformed outward in the diametrical direction of the guide roll 120 by the inertia force F1. A tensile force of the portion of the electrode sheet 1 that is wound along the guide roll 120 supplies the tab 4 with a tensile stress acting inward in the width direction of the electrode sheet 1. As a result, the tab 4 tends to be shrunk inward in the width direction of the electrode sheet 1. If, at this point, the tab 4 is slightly deformed outward in the diametrical direction of the guide roll 120, a stronger tensile force acts on an outer surface of the tab 4 in the diametrical direction of the guide roll 120. As a result, the tab 4 is warped outward in the diametrical direction of the guide roll 120.

[Reasons why the Rise of the Tab is Suppressed]

In the sheet transportation device 10 according to this preferred embodiment, as shown in FIG. 2, a portion of the electrode sheet 1 that is wound along the roll main body 21 has an elongation E1 by the tensile force, and the elongation E1 is larger than an elongation E2 of the floating portion, for example, the end 2R and the vicinity thereof. Due to the difference between the elongation E1 and the elongation E2, the tab 4 slightly falls inward in the diametrical direction of the guide roll 20. In this preferred embodiment also, a tensile force of the portion of the electrode sheet 1 that is wound along the guide roll 20 supplies the tab 4 with a tensile stress acting inward in the width direction of the electrode sheet 1. As a result, the tab 4 tends to be shrunk inward in the width direction of the electrode sheet 1. In this preferred embodiment, the tab 4 has been slightly deformed inward in the diametrical direction of the guide roll 20, due to the difference between the elongation E1 and the elongation E2. Therefore, a stronger tensile force acts on an inner surface of the tab 4 in the diametrical direction of the guide roll 20, and the tab 4 tends to fall inward in the diametrical direction of the guide roll 20. However, the tab 4 is supported by the short-diameter portion 22, and therefore, such deformation is suppressed. The tab 4 is not warped outward or inward in the diametrical direction of the guide roll 20. In the case of the conventional guide roll 120, as shown in FIG. 3, an elongation E3 of the electrode sheet 1 is the same regardless of the position in the width direction. Therefore, the conventional guide roll 120 does not provide the above-described effect of preventing the tab 4 from being raised.

[Preferred Shapes of the Guide Roll]

Figure 4:
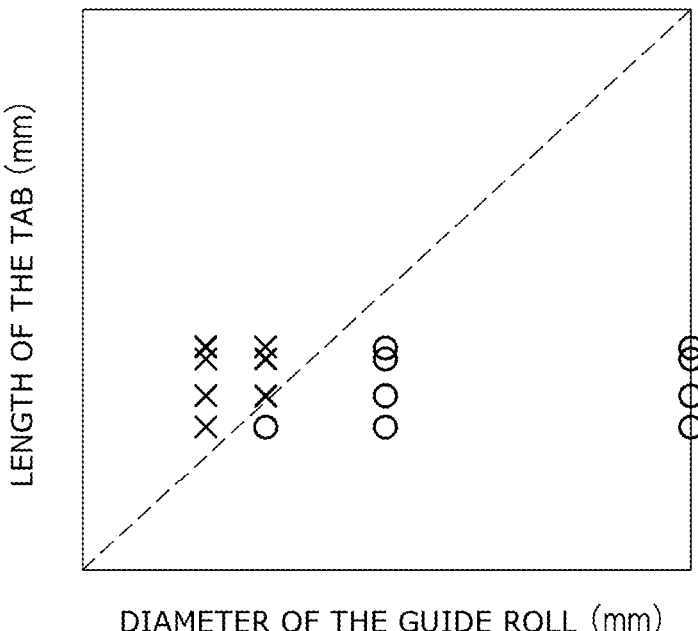
FIG. 4 is a graph showing the relationship among the length of a tab, the diameter of a guide roll and rise of the tab in the conventional sheet transportation device.

Hereinafter, preferred shapes of the guide roll 20 will be described. FIG. 4 is a graph, regarding the conventional sheet transportation device, showing the relationship among the length L1 (see FIG. 3) of the tab 4, the diameter D1 (see FIG. 3) of the guide roll 120 and the rise of the tab 4. The length L1 of the tab 4 is the length of the tab 4 in the longitudinal direction of the electrode sheet 1. In FIG. 4, "○" shows the conditions under which the tab 4 was not raised in the conventional sheet transportation device. In FIG. 4, "X" shows the conditions under which the tab 4 was raised. Under the conditions of "X", the tab 4 was raised many times. As shown in FIG. 4, the tab 4 is raised more easily in the case where the length L1 (see FIG. 3) of the tab 4 in the longitudinal direction is longer than the diameter D1 (see FIG. 3) of the guide roll 120.

Figure 5:
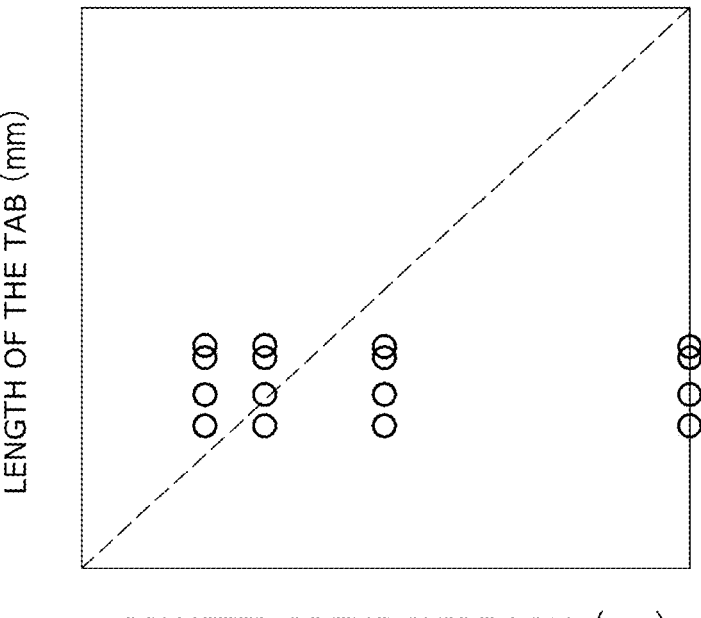
FIG. 5 is a graph showing the relationship among the length of a tab, the diameter of a guide roll and rise of the tab in the sheet transportation device according to the preferred embodiment.

FIG. 5 is a graph, regarding the sheet transportation device 10 according to this preferred embodiment, showing the relationship among the length L1 of the tab 4, the diameter D1 of the guide roll 20 and the rise of the tab 4. As shown in FIG. 5, in the sheet transportation device 10 according to this preferred embodiment, the results under the conditions of "X" in FIG. 4 have been improved to be "○" In this preferred embodiment, even in the case where the length L1 of the tab 4 in the longitudinal direction is longer than the diameter D1 of the guide roll 20, the tab 4 was not raised almost at all. As shown in FIG. 4 and FIG. 5, the guide roll 20 according to this preferred embodiment provides the effects thereof especially well in the case where the diameter D1 of the roll main body 21 is shorter than the length L1 of the tab 4 in the longitudinal direction of the electrode sheet 1.

Figure 6:
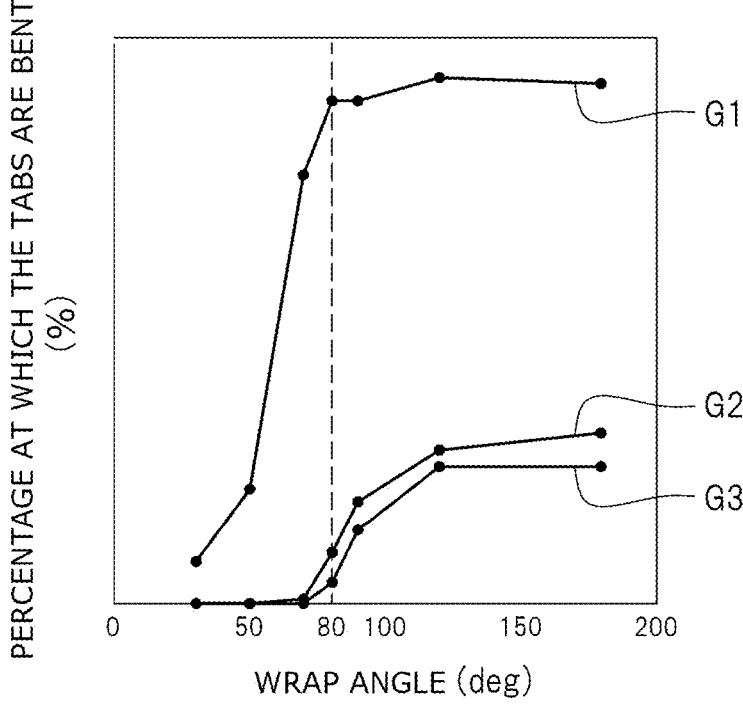
FIG. 6 is a graph showing the relationship between the wrap angle and the rise of the tab in the conventional sheet transportation device.

FIG. 6 is a graph showing the relationship between the wrap angle θ and the rise of the tab 4 in the conventional sheet transportation device. The wrap angle θ is the angle at which a portion of the electrode sheet 1 is wound along the guide roll 120 as shown in FIG. 3 (also see FIG. 1). In the graph of FIG. 6, line G1 shows the relationship between the wrap angle θ and the rise of the tab 4 in the case where the diameter D1 of the guide roll 120 is shorter than the length L1 of the tab 4 in the conventional sheet transportation device. Line G2 shows the relationship between the wrap angle θ and the rise of the tab 4 in the case where the diameter D1 of the guide roll 120 is longer than the length L1 of the tab 4 in the conventional sheet transportation device. Line G3 shows the relationship between the wrap angle θ and the rise of the tab 4 in the case where the diameter D1 of the guide roll 120 is longer than that in the case of line G2 in the conventional sheet transportation device. As shown in FIG. 6, in the conventional sheet transportation device, the percentage at which the tab 4 is raised is high when the wrap angle θ (see FIG. 3) is 80 degrees or larger, regardless of the size of the diameter D1 of the guide roll 120. Therefore, the guide roll 20 according to the preferred embodiment provides the effects thereof especially well in the case where the electrode sheet 1 is wound along the roll main body 21 at a wrap angle θ of 80 degrees or larger. In actuality, there are very few sheet transportation devices for transporting the electrode sheet 1, including a guide roll with which the wrap angle θ is smaller than 80 degrees.

In addition, according to the knowledge of the present inventor, it is preferred that the roll main body 21 is located closer to the center, in the width direction, of the electrode sheet 1 by at least 1 mm than the transportation path for the end 2R of the electrode sheet 1, the plurality of tabs 4 being provided along the end 2R. That is, it is preferred that the distance W1 in FIG. 2 is 1 mm or longer. With such a positional arrangement, at least a portion of the electrode sheet 1 within 1 mm from the end 2R toward the center floats in the air. As long as the floating portion of the electrode sheet 1 has a width of at least 1 mm, the tab 4 easily falls inward in the diametrical direction of the guide roll 20 due to the difference between the elongation E1 of the portion wound along the roll main body 21 and the elongation E2 of the floating portion. Therefore, such a structure suppresses the rise of the tab 4 with more certainty.

The sheet transportation device 10 according to this preferred embodiment includes the meandering correction device 30 including the sensor 31, which detects the position of the electrode sheet 1 in the width direction, and correcting the position of the electrode sheet 1 in the width direction based on the position of the electrode sheet 1 detected by the sensor 31. In the case where the meandering correction device 30 is not provided, the distance W1 between the end 2R of the electrode sheet 1 and the roll main body 21 is not kept constant, and the end 2R of the electrode sheet 1 may undesirably pass along a path inner to the roll main body 21. The provision of the meandering correction device 30 suppresses the positional shift of the electrode sheet 1 in the width direction, and as a result, locates, with certainty, the end 2R of the electrode sheet 1 at an appropriate position outer to the roll main body 21.

In the case where the distance W1 between the roll main body 21 and the end 2R of the electrode sheet 1 is too long, the tab 4 of the electrode sheet 1 and the portion of the electrode sheet 1 that is at the root of the tab 4 are bent inward in the diametrical direction of the guide roll 20. In this case, a mark may undesirably be left in a portion of the electrode sheet 1 that is in contact with the stepped portion 23. Therefore, it is preferred that the distance W1 between the roll main body 21 and the end 2R of the electrode sheet 1 is 2 mm or shorter.

According to the knowledge of the present inventor, it is preferred that the radius R2 of the short-diameter portion 22 is shorter by at least 0.5 mm than the radius R1 of the roll main body 21. That is, it is preferred that the height H1 of the stepped portion 23 is 0.5 mm or longer. Such a structure generates a space in which the tab 4 may fall inward in the diametrical direction of the guide roll 20. Therefore, such a structure suppresses the rise of the tab 4 with more certainty. The difference between the radius R1 of the roll main body 21 and the radius R2 of the short-diameter portion 22 (the height H1 of the stepped portion 23) is preferably 1 mm or shorter. From the point of view of providing a sufficient strength of the guide roll 20 with certainty, it is preferred that the radius R2 of the short-diameter portion 22 is not too shorter than the radius R1 of the roll main body 21.

[Functions and Effects of the Preferred Embodiment]

Hereinafter, functions and effects provided by the sheet transportation device 10 according to this preferred embodiment will be described.

The sheet transportation device 10 according to this preferred embodiment transports the band-like electrode sheet 1 in the longitudinal direction thereof. The sheet transportation device 10 includes the guide roll(s) 20 located in the transportation path for the electrode sheet 1 and extending in the width direction of the electrode sheet 1. The electrode sheet 1 is to be wound along the guide roll(s) 20. The electrode sheet 1 includes the plurality of tabs 4 provided intermittently in the longitudinal direction thereof, along at least one end 2R thereof in the width direction. The plurality of tabs 4 each protrude in the width direction of the electrode sheet 1 beyond the end 2R. Each of the guide roll(s) includes the cylindrical roll main body 21 and the short-diameter portion 22 connected with the roll main body 21 so as to be outer, in the width direction of the electrode sheet 1, to the roll main body 21. The roll main body 21 is located closer to the center, in the width direction, of the electrode sheet 1 than the transportation path for the end 2R of the electrode sheet 1, the plurality of tabs 4 being provided along the end 2R. The portion of the electrode sheet 1 that is closer to the center in the width direction than the end 2R is wound along the roll main body 21. The short-diameter portion 22 is connected with the roll main body 21 via the stepped portion 23, and has an outer diameter shorter than an outer diameter of the roll main body 21.

The sheet transportation device 10 having such a structure suppresses the rise of the tabs 4 for the above-described reasons. The sheet transportation device 10 does not include a special component such as a blow mechanism as described in Japanese Laid-Open Patent Publication No. 2021-086698, and therefore, suppresses the rise of the tabs 4 with a simpler structure. The sheet transportation device 10 does not include a component such as a guide as described in Japanese Laid-Open Patent Publication No. 2016-219329. Therefore, the undesirable possibility that the tabs 4 rub against the guide and thus are damaged is lowered.

The preferred range of the distance W1, in the width direction of the electrode sheet 1, between the roll main body 21 and the end 2R of the electrode sheet 1, the preferred range of the height H1 of the stepped portion 23, and the functions and effects provided by the distance W1 and the height H1 being in the respective preferred ranges, are as described above. The ranges of the diameter D1 of the roll main body 21 and the wrap angle θ in which the sheet transportation device 10 according to this preferred embodiment provide the functions and effects thereof especially well are as described above. The functions and effects provided by the meandering correction device 30 are also as described above.

Other Preferred Embodiments

A preferred embodiment of the sheet transportation device proposed herein is described above. The above-described preferred embodiment is merely one example, and the present invention may be carried out in other preferred embodiments. For example, in the above-described preferred embodiment, the stepped portion 23 extends so as to be perpendicular to the outer circumferential surface of the roll main body 21. Alternatively, the stepped portion may extend in a tapering manner so as to obliquely cross the outer circumferential surface of the roll main body, unless preventing the tab from falling inward in the diametrical direction of the guide roll. The stepped portion does not need to have a flat cross-section, and may have a cross-section recessed inward in the width direction of the sheet.

For example, at least one of the guide rolls does not need to include both of a roll main body located closer to the center, in the width direction, of the electrode sheet than the end of the electrode sheet and the short-diameter portion. The technology disclosed herein does not need to be applied to all the guide rolls in the sheet transportation device.

In the above-described preferred embodiment, the sheet transportation device 10 transports the electrode sheet 1 including the electrode active material layer 3 and the tabs 4. Alternatively, the sheet transportation device may transport an electrode sheet that does not include the electrode active material layer.

The above-described preferred embodiment does not limit the present invention in any way unless otherwise specified. The technology disclosed herein may be altered in any of various manners. The elements and the processes referred to herein may each be omitted when being appropriate, or may be combined in an appropriate manner, unless any specific problem is caused.

This specification includes the following disclosure.

Item 1:

A sheet transportation device transporting a band-like sheet in a longitudinal direction thereof, the sheet transportation device comprising a guide roll located in a transportation path for the sheet and extending in a width direction of the sheet, the sheet being to be wound along the guide roll, wherein:

the sheet includes a plurality of tabs provided intermittently in the longitudinal direction thereof, along at least one end thereof in the width direction thereof, the plurality of tabs each protruding in the width direction beyond the end, and the guide roll includes:

a cylindrical roll main body located closer to a center, in the width direction, of the sheet than a transportation path for the end of the sheet along which the plurality of tabs are provided, a portion of the sheet that is closer to the center in the width direction than the end being wound along the roll main body, and a short-diameter portion connected, via a stepped portion, with the roll main body so as to be outer, in the width direction, to the roll main body, the short-diameter portion having an outer diameter shorter than an outer diameter of the roll main body.

Item 2:

The sheet transportation device according to item 1, wherein the roll main body is located closer to the center, in the width direction, of the sheet by at least 1 mm than the transportation path for the end of the sheet along which the plurality of tabs are provided.

Item 3:

The sheet transportation device according to item 1 or 2, wherein the short-diameter portion is cylindrical, and has a radius shorter by at least 0.5 mm than a radius of the roll main body.

Item 4:

The sheet transportation device according to any one of items 1 through 3, wherein the roll main body has a diameter shorter than a length of each of the tabs in the longitudinal direction of the sheet.

Item 5:

The sheet transportation device according to any one of items 1 through 4, wherein the sheet is wound along the roll main body at a wrap angle of 80 degrees or larger.

Item 6:

The sheet transportation device according to any one of items 1 through 5, further comprising a meandering correction device including a sensor that detects a position of the sheet in the width direction, and correcting the position of the sheet in the width direction based on the position of the sheet detected by the sensor.

Item 7:

The sheet transportation device according to any one of items 1 through 6, wherein the sheet is an electrode sheet for an electricity storage device, the electrode sheet including a metal current collector foil and an electrode active material layer formed thereon.

What is claimed is:

1. A sheet transportation device transporting a band-shaped sheet in a longitudinal direction thereof, the sheet transportation device comprising:

a guide roll located in a transportation path for the sheet and extending in a width direction of the sheet, the sheet being to be wound along the guide roll, wherein:

the sheet includes a plurality of tabs provided intermittently in the longitudinal direction thereof, along at least one end thereof in the width direction thereof, the plurality of tabs each protruding in the width direction beyond the at least one end, the guide roll includes:

a cylindrical roll main body located closer to a center, in the width direction, of the sheet than a transportation path for the at least one end of the sheet along which the plurality of tabs are provided, a portion of the sheet that is closer to the center in the width direction than the at least one end being wound along the roll main body, and a short-diameter portion connected, via a stepped portion, with the roll main body so as to be outer, in the width direction, to the roll main body, the short-diameter portion having an outer diameter shorter than an outer diameter of the roll main body, and the outer diameter of the roll main body is shorter than a length of each of the plurality of tabs in the longitudinal direction of the sheet.

2. The sheet transportation device according to claim 1, wherein the roll main body is located closer to the center, in the width direction, of the sheet by at least 1 mm than the transportation path for the at least one end of the sheet along which the plurality of tabs are provided.

3. The sheet transportation device according to claim 1, wherein the short-diameter portion is cylindrical, and has a radius shorter by at least 0.5 mm than a radius of the roll main body.

4. The sheet transportation device according to claim 1, wherein the sheet is wound along the roll main body at a wrap angle of 80 degrees or larger.

5. The sheet transportation device according to claim 1, further comprising a meandering correction device including a sensor configured to detect a position of the sheet in the width direction, the meandering correction device configured to correct the position of the sheet in the width direction based on the position of the sheet detected by the sensor.

6. The sheet transportation device according to claim 1, wherein the sheet is an electrode sheet for an electricity storage device, the electrode sheet including a metal current collector foil and an electrode active material layer formed thereon.

* * * * *